United States Patent [19]
Barry et al.

[11] 3,786,370
[45] Jan. 15, 1974

[54] SPACEBORNE SUN PUMPED LASER

[75] Inventors: James D. Barry, Fairborn; Paul M. Freedman, Wright-Patterson AFB; George Matassov, Dayton, all of Ohio

[73] Assignee: The United States of America as represented by the Secretary of the United States Air Force, Washington, D.C.

[22] Filed: May 1, 1973

[21] Appl. No.: 356,270

Related U.S. Application Data

[63] Continuation-in-part of Ser. No. 340,515, March 12, 1973.

[52] U.S. Cl. .............................................. 331/94.5
[51] Int. Cl. ............................................. H01s 3/02
[58] Field of Search .................. 331/94.5; 244/1 SS, 244/1 SA

[56] References Cited
UNITED STATES PATENTS

| | | | |
|---|---|---|---|
| 3,297,958 | 1/1967 | Weiner | 331/94.5 |
| 3,421,715 | 1/1969 | Cohlan | 331/94.5 |
| 3,451,010 | 6/1969 | Maiman | 331/94.5 |
| 3,732,505 | 5/1973 | Freedman | 331/94.5 |

Primary Examiner—William L. Sikes
Attorney—Harry A. Herbert, Jr. et al.

[57] ABSTRACT

An improved sun pumped laser communication system for synchronous satellites in the galactic plane is provided by mounting the sun pumped laser in a sun tracking telescope pivoted in hollow gimbals placed on the axis of rotation of the satellite. The laser beam is directed to the earth or another spacecraft receiver from the satellite by a tracking telescope also pivoted in hollow gimbals placed on the axis of rotation of the satellite. The laser beam traverses the satellite along its axis of rotation by passing through the hollow gimbals. The polarization of the laser beam is adjusted for maximum efficiency and controlled to compensate for the orientation changes between the laser and modulator. By mounting the laser in the sun tracking telescope with the laser heat sink communicating with a thermally emissive face in the side of the telescope tube, the laser is cooled by thermal radiation which is always automatically directed toward deep space.

6 Claims, 7 Drawing Figures

SPACEBORNE SUN PUMPED LASER

RELATED APPLICATION

This is a continuation-in-Part of prior patent application Ser. No. 340,515, filed Mar. 12, 1973.

BACKGROUND OF THE INVENTION

The field of the invention is in the satellite communication art.

Solar (sun pumped) lasers are well known. U.S. Pat. No. 3,297,958 to patentee M. Weiner is an example of an end pumped solar laser and U.S. Pat. No. 3,451,010 to patentee T. H. Maiman shows an example of a side pumped solar laser. Technical Report AD–481927 "Sun-Pumped Laser" by C. G. Yound (1966), and Technical Report AD–737787, "Sun Pumped Laser" by Lloyd Huff (1971), are also examples of the prior art.

In the prior art satellite laser communication systems the laser has been located in the body of the satellite and the cooling of the laser rod has been a problem. The excess heat energy has to be removed from the laser by a cooling system within the satellite, directed by various paths through the satellite, and radiated to space. For effective radiation to take place the thermal radiation must be directed in the direction of "deep space," that is, at right angles to the galactic plane. This has necessitated a very complicated thermal system because the satellite has its spin axis also perpendicular to the galactic plane and its attitude in space is generally constantly slowly changing. Some prior art devices have complicated optical systems for directing the sun's rays onto the laser. The routing of the laser energy from the laser to the pointing telescope, directed toward the distant receiver, has also required complicated optical universal joints to direct the laser beam through the satellite and compensate for the many angular variations.

SUMMARY OF THE INVENTION

The invention provides a sun pumped laser communication system for satellites wherein the laser element is easily cooled by direct radiation into deep space and the polarization of the laser beam is constantly maintained at the appropriate angle with respect to the modulator for all angular variations of the polarization due to the directing optics. The laser beam is directed from the laser source through the satellite to the transmitting telescope and associated optical elements along the satellite axis by using hollow gimbals.

DESCRIPTION OF THE PREFERRED EMBODIMENT

Figure 1:
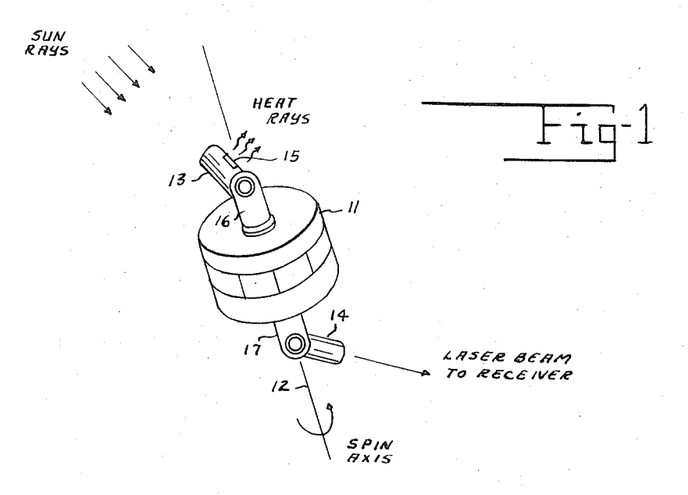
FIG. 1 is a pictorial view of a satellite in space incorporating the invention.

FIG. 1 shows a pictorial view of a representative satellite spacecraft 11 having the disclosed invention. Generally the spacecraft is a synchronous, geostationary satellite rotating about an axis aligned with the axis of the earth such that the rotation axis is substantially perpendicular to the galactic plane. The general configurations of such spacecraft are that of a cylinder with the axis of the cylinder coinciding with the axis of rotation. The ends of the cylinder, being substantially perpendicular to the axis of rotation, do not have the sun in view along the axis. In order to place the solar energy collector (that is the sun tracking telescope 13), and the laser transmitter pointing optics (that is the earth (or another satellite) tracking telescope 14), in positions of mutual non-interference, as well as being directionally independent of the synchronous spacecraft, they are placed at opposite ends of the cylindrical spacecraft and pivoted in gimbals on the spacecraft axis of rotation. Each telescope has its own independent pointing system driving through its respective gimbals. By mounting the laser in the sun tracking telescope 13, which is activated to continuously point toward the sun, the cooling of the laser may readily be accomplished by having a radiating surface 15 (which is thermally connected with the laser heat sink) in the side of the telescope. Thus, the thermal radiator is automatically and without any mechanical complications always looking into deep space independent of the orientation of the spacecraft.

The optical path of the laser beam is directed through the hollow gimbals 16 and 17, and substantially along the spin axis of the spacecraft while traversing the spacecraft. This arrangement provides a laser system that is relatively independent of the spacecraft's attitude and rotation. It also eliminates the need for complicated internal directing optics.

Figure 2:
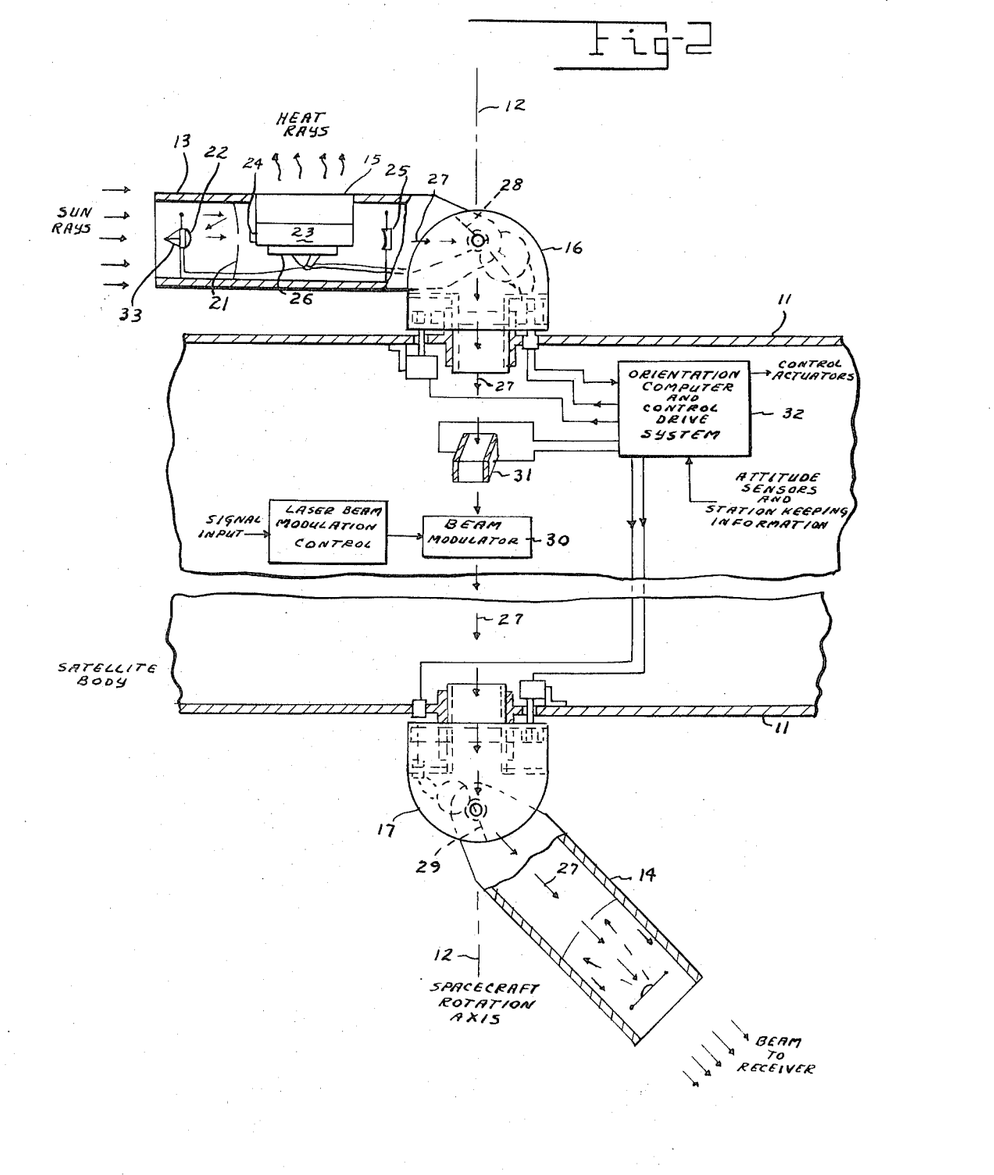
FIG. 2 is a schematic diagram of an embodiment of the invention having a controlled polarization rotation crystal.

A detailed schematic diagram of an embodiment of the invention is shown in FIG. 2. The sun tracking telescope 13 has conventional Cassegrain optics with primary collector mirror 21 and secondary collector mirror 22 concentrating the solar energy on the end of conventional end pumped laser rod 23. The laser has the conventional laser optics 24 and 25, and electronic system 26. The laser is maintained at 0°C or below by a conventional heat sink that surrounds the laser rod and is thermally connected to the conventional "blackbody" thermal radiator 15 radiating thermally directly into deep space. It is to be noted that with the sun tracking telescope pointing at the sun that the radiation from the thermal radiator will always be automatically directed to deep space. The area of the thermal radiator which is mounted on the sun tracking telescope is determined by the amount of thermal power to be dissipated. For example in a specific embodiment where 20 watts of thermal energy are to be dissipated to maintain the laser rod at a temperature of 0°C an area of 500 cm² provided the required cooling. (With a deep space temperature of about 3°K.) Those persons practicing this invention will readily adapt the area of the black-body deep space radiator to accommodate the dissipation requirements of the particular laser being used. (Obviously, other separate conventional thermal radiators may be used in the satellite to provide the necessary cooling of other on-board equipment.) Additional details of embodiments of the sun tracking telescope will be discribed later in connection with FIGS. 4 and 5.

The laser beam 27 from the laser is directed into the satellite body 11 along its axis of rotation 12 by the folding mirror 28. (Also see FIG. 3.) It is generally desirable that the laser beam be plane polarized to a high degree and that the orientation changes caused by reflections from the directing optics not interfere with the beam modulation. Polarization orientation modifications after beam modulation do not interfere with data transmission. Mirror 28 is referred to as a folding mirror in that its magnitude of angle of rotation is one-half that of the angle of rotation of the telescope. This also applies to the folding mirror 29 in the receiver tracking telescope 14. Conventional laser beam modulator 30 modulates the beam in accord with the intelligence contained in the signal being transmitted to the earth or other appropriate remote receiver. An example of a suitable beam modulator element is the commercially available lithium tantalate electro-optical crystal modulator.

Polarization rotation crystal 31 is a conventional electro-optical polarization rotation crystal. The plane of polarization of the laser beam is electro-optically rotated in response to the electric field between the electrodes on the crystal. The electric field across the crystal is controlled by the onboard computer 32. A change in the voltage potential between the electrodes on the crystal changes the electric field across the crystal and hence its amount of rotation of the polarization of the beam. The polarization rotation crystal 31, which may be a conventional lithium tantalate polarization rotation crystal, adjusts the plane of polarization of the laser beam to present a fixed plane of polarization of the laser beam to the modulator 30. This makes the modulation changes in the polarization of the beam brought about by the modulation crystal a true representation of the intelligence transmitted, uneffected by polarization changes taking place in the laser beam prior to the modulator. The reflection of the laser light by the folding mirror 29 causes well known modifications to the polarization orientation of the laser beam. The polarization orientation of the laser beam at the input to crystal 31 also changes with changes in the relative angular position of the sun tracking telescope 13 with respect to the modulator. These changes and the instant relative positions are all contained in the computer information in the computer 32, and the computer supplies the voltage potential to the electrodes on the polarization rotation crystal 31 such that the laser beam entering the modulator 30 is at all times focused and critically aligned to the preferred entrance polarization of the modulation crystal.

The computer and actuation system 2 is conventional with satellite spacecraft. It receives position indication and control signal inputs and provides control signals for station keeping, positioning, attitude changing, antenna directing, switching and other on-board functions. In this invention the computer 32, in addition to these other functions controls the angle of polarization of the laser beam entering the modulator by sensing the angular orientation of the sun tracking telescope 13, the folding mirror 29, and the preferred modulator axis and determines the appropriate voltage to crystal 31 so that the proper polarization of the laser beam is always presented to the modulator 30. It also controls the aiming of the sun tracking telescope and the receiver tracking telescope. The receiver telescope is directed toward the earth or other spacecraft receiver by the computer from the relative positioning information maintained in the computer in regard to the position of the satellite with respect to the earth and by signal information transmitted to the satellite from the earth or other receiver station. The sun tracking telescope contains a conventional sun seeker element 33, positioned in axial alignment with the axis of the telescope, that provides an electrical signal indicative of its pointing accuracy toward the sun, that is, its accuracy of axial alignment with the sun rays. The output from the sun seeker is conducted through two sets of slip rings in the gimbals 16 to the computer. The computer and drive system 32 then generate the signals that actuate the drive mechanisms to point the telescope 13 toward the sun in accord with the signals from the sun seeker element. Sun seeker and light direction detecting devices are well known. An example of a suitable sun seeker element is the "Digital Solar Aspect Sensor" manufactured by the Adeole Corporation. Generally, the sun seeker element and the secondary collector element 22 are axially mounted near the sun end of the telescope on a common "spider" support member.

Figure 3:
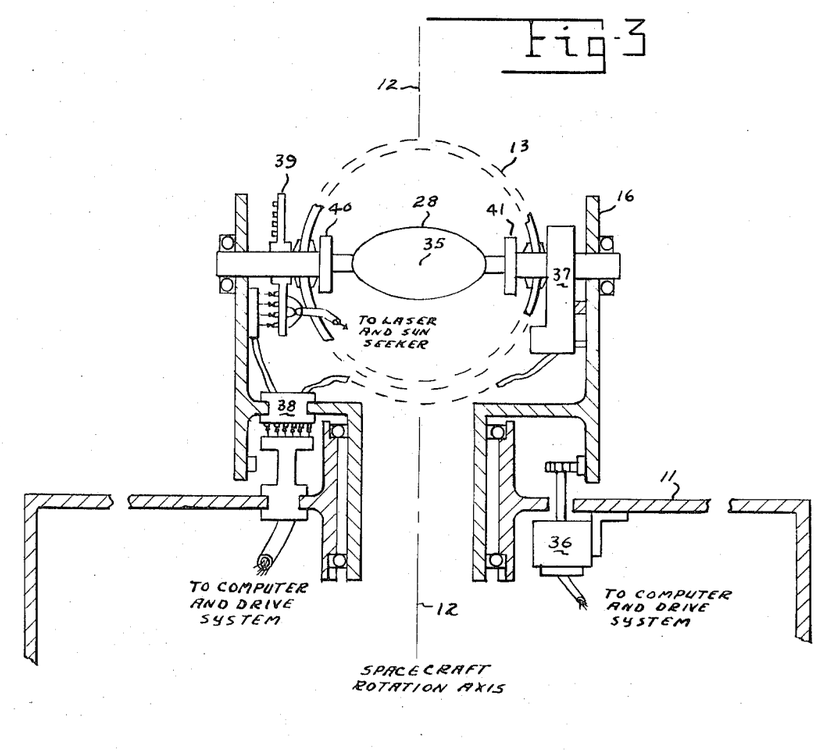
FIG. 3 is a schematic diagram of typical hollow gimbals.

FIG. 3 is a representative schematic diagram of an embodiment of the gimbals for the sun tracking telescope. The folding mirror 28 is located such that the center of the mirror is always maintained at the intersection of the spacecraft rotation axis 12 and the axis of the telescope 35. Servomotor 36 rotates the outer member of the gimbals about the spacecraft rotation axis and servomotor 37 positions the telescope to the desired angle of tilt, that is, the angle between the telescope axis and the rotation axis of the spacecraft. Both servomotors comprise a part of the loop of the servo system positioning the sun seeker and hence the sun tracking telescope in alignment with the sun rays. In the hollow gimbals attaching the sun tracking telescope to the satellite body two sets of slip ring assemblies 38 and 39 are necessary. The first set 38 carries the electrical signals going to the tilt drive mechanism 37 located in the first ring of the gimbals and also those going through the second set of slip rings 39 into the second or inner ring of the gimbals and onto the laser and sun seeker.

It has previously been mentioned that the folding mirror 28 traverses in angle one-half the angle traversed by the telescope 13 to always maintain the proper reflection of the laser beam from the axis of the telescope 35 to the rotation axis of the satellite 12. This is accomplished by conventional 2 to 1 gear boxes 40 and 41. (Direct drive torque motors may also be used.) While only one gear box is required to provide the necessary drive action, generally slightly better alignment accuracy is obtained using two, one at each side of the folding mirror. The shaft attached to the mirror 28 turns on bearing surfaces inside the larger hollow shaft attached to the telescope 13. The inner shaft is driven in rotation by the outer shaft through the planetary reduction gearing in the gear boxes 40 and 41. The gimbals attaching the receiver tracking telescope to the satellite are identical in configuration with those described for the sun tracking telescope except slip ring assembly 39 is not needed since for this invention the earth tracking telescope does not contain electrical signal generating or utilizing elements.

Figure 4:
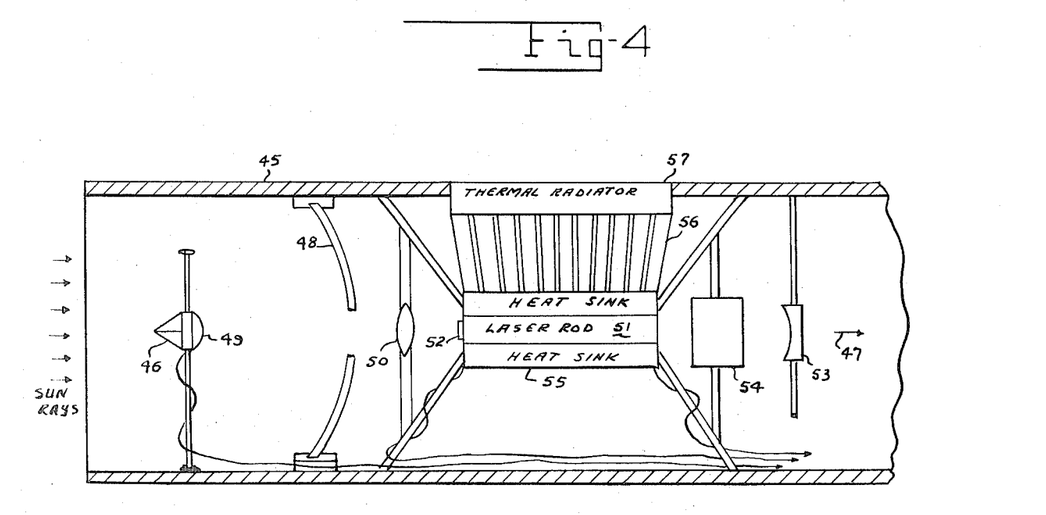
FIG. 4 is a schematic diagram of a representative sun tracking telescope having Cassegrain type optics.
Figure 5:
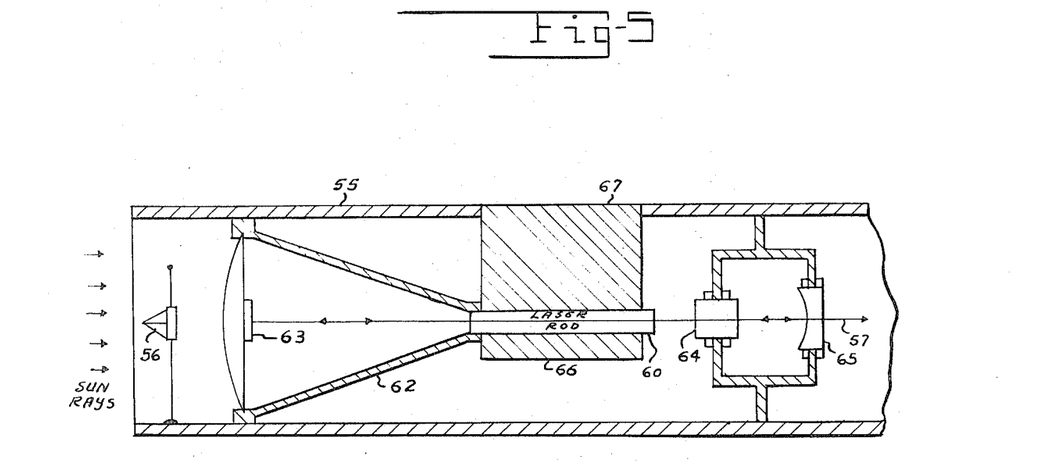
FIG. 5 is a schematic diagram of a representative sun tracking telescope having a light concentrating cone.

FIGS. 4 and 5 show schematically two representative embodiments of sun pumped laser configurations. The means for actuating the sun tracking telescopes 45 and 55, including the sun seeker elements 46 and 56, are as previously disclosed. Likewise, the directing of the laser beams 47 and 57 from the telescope through the satellite and onto the earth or other spacecraft are as previously disclosed. The optical system shown in FIG. 4, comprising the primary collector mirror element 48, the secondary collector reflecting element 49, and the focusing lens element 50, is the conventional Cassegrain type of structure. The secondary collector 49 has on the laser side an optical surface which is highly (effectively 99+ percent) reflective at the laser pumping frequency, such as, within the 7,300A to 9,000A band and transmissive to other wavelengths. The other side of element 49 is highly reflective to all wavelengths. By using such optical surfaces the useless solar energy transferred into the laser system is substantially reduced thereby reducing the thermal load on the laser system to be dissipated. Such coatings are commercially available and well known in the "cold mirror" art. The laser system comprising the solid state laser rod element 51, the laser mirror elements 52 and 53, and the mode locking or single frequency element 54 (if used), are all conventional elements. Their structure and the techniques of their use are all well known. The laser rod 51 is surrounded by the heat sink 55. In this particular embodiment heat-pipe structure 56 is used to transfer the heat energy from the heat sink 55 to the conventional black body thermal radiator 57. In some embodiments, depending on the particular laser used and the amount of heat to be removed from the laser and dissipated, the heat pipe structure 56 may not be needed and direct thermal contact from the laser heat sink 55 to the radiator 57 may be used as shown in the embodiment shown in FIG. 5.

In the embodiment illustrated schematically in FIG. 5 the solar radiation is concentrated in the laser rod 60 by the cone field lens 61 and the light concentrating cone 62. The laser optical cavity totally reflecting mirror 63, defining one end of the optical cavity, is positioned on the back side of the cone field lens in this embodiment instead of on the end of the laser rod as in the embodiment of FIG. 4. (The mirror 52, of FIG. 4, is reflective to the laser light frequency and substantially transmissive to pumping frequency of the sun light.) Mode locking or single frequency element 64 and laser output mirror 65 are similar to the previously described embodiment. This laser structure is well known in the art and further described in the previously mentioned prior art referenced publication AD-737787. The heat sink 66 transfers the dissipated heat energy from the laser rod to the deep space radiating surface 67 by direct thermal conduction.

One particular embodiment of the invention has a Nd:YAG laser rod element. Approximately 400 watts of incident solar energy is available at the effective optical antenna, that is, the opening at the sun end of the sun tracking telescope which is about 0.32 meter in diameter. The useful laser output from the system is approximately 1 watt. Approximately 20 watts of thermal power was dissipated and radiated to deep space. The laser was maintained at approximately a temperature of 0°C. The laser mirror at the sun end of the laser was highly reflective at substantially 1.06 microns, (the laser frequency) and highly transmissive in the pump bands of 7,300A to 9,000A. Selective reflective and antireflective coatings are well known as is their use in laser optical cavities. Generally the pump cavity surfaces should be highly reflective at the pump bands (such as 7,300A to 10,000A) with a wide enough bandwidth to allow for reflection at various angles of incidence, and transmissive at all other wavelengths so that unwanted radiation energy may be deposited in the substrait structure and removed as heat.

Generally, synchronous satellites are nominally in the galactic plane and stabilized such that the spin axis of the satellite spacecraft is substantially constantly perpendicular to the galactic plane. In addition the satellite spin may be made to be one revolution per year, i.e., a solar phased satellite. Under these conditions the tracking of the sun and the movements relative to the spacecraft of the sun tracking telescope are very small. Also, the movements of the folding mirror are thus very small. For instance, referring to FIG. 6, the sun tracking angle, that is the angle between the axis 35 of the sun tracking telescope tube 13 and the spacecraft rotation axis 12, is substantially 90°. Since the spin axis is stabilized within a few degrees the variations in the sun tracking angle from 90° will generally be within ± 2°. Thus, under these conditions the angular variations of the folding mirror in the sun tracking telescope from 45° will be approximately ± 1°. These small variations greatly reduce the reflection losses occurring to the beam upon reflection from the folding mirror for a specific polarization and beam incidence angle.

The laser beam output from the conventional laser 23 is a plane polarized beam. The plane of the polarization is basically dependent upon the physical rotational orientation of the laser structure, however, it may also be controlled by intercavity elements irrespective of the particular positioning of the physical structure. The effects on the polarization of a plane polarized wave by reflecting from dielectric and metallic mirrors are well known. (See Born and Wolf, "Principles of Optics," second edition, commencing at page 619, and Jenkins and White, "Fundamentals of Optics," third edition, commencing at pages 515 and 520.)

Figure 6:
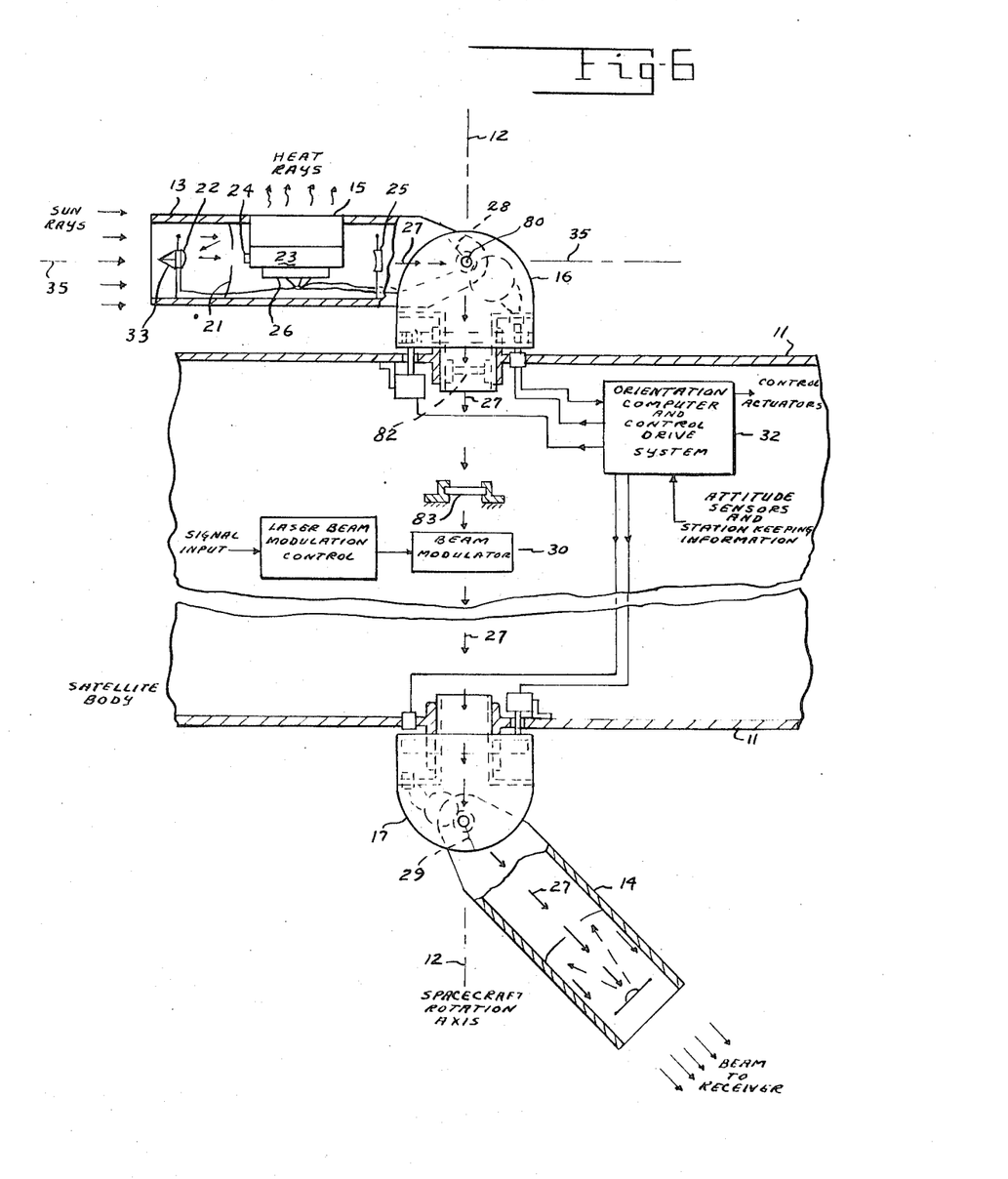
FIG. 6 is a schematic diagram of an embodiment of the invention having polarization control by quarter wavelength plates.
Figure 7:
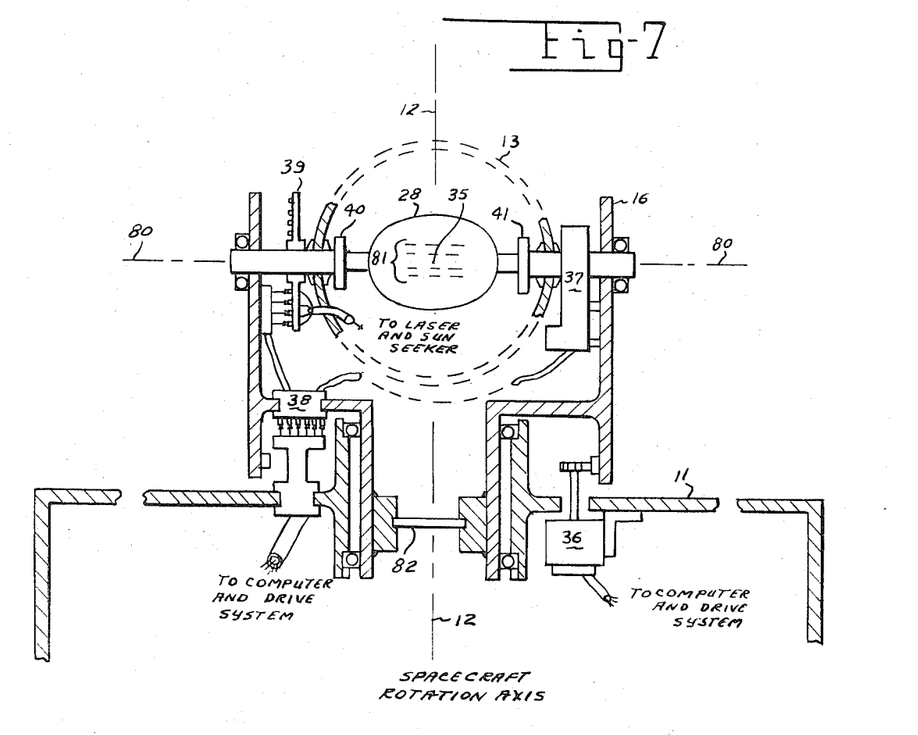
FIG. 7 is a schematic diagram of typical hollow gimbals having a quarter wavelength polarization changing element.

The embodiment of the invention shown schematically in FIGS. 6 and 7 is somewhat simplified in construction from the embodiment shown in FIGS. 2 and 3 in that no computer controlled polarization rotation crystal is required. However, a limitation is required on the relationship of the plane of polarization of the laser beam and the rotation axis of the folding mirror in the sun tracking telescope, and two quarter wavelength plates are used instead of the computer controlled polarization rotation crystal. Referring to FIG. 6, the laser 23 is arranged such that the plane of polarization of the laser beam striking the folding mirror 28 is either perpendicular or parallel to the mirror axis of rotation 80. That is, the laser beam striking the folding mirror is plane polarized in a direction perpendicular to the plane formed by the mirror normal and the axis of incidence, or in a direction parallel to the axis 12 and within that plane. This will avoid the possibility of the formation of elliptically polarized light in the reflection from the mirror. The perpendicular component is generally preferred as it is approximately 2 percent more reflective than the parallel component. This is generally the situation with metal mirrors and it is also true for dielectric coatings at approximately 45° incidence. The phase of the reflected beam may change with respect to the incident beam with various types of mirrors used. The phase change is not critical; that the incident beam is perpendicular or parallel plane polarized as it strikes the mirror is critical, and as previously stated the perpendicularly polarized beam is preferred. Generally a dielectric type mirror is preferred to a metal one since it may more readily be optimized for any particular laser wavelength used in the apparatus. These mirrors and coatings, whether metal or dielectric, are well known and commercially available from many sources. Plane polarized light represented 81, FIG. 7, propagating along telescope tube axis 35 strikes mirror 28 with an angle of incidence of approximately 45°, with the plane of polarization either parallel or perpendicular, but preferably parallel to mirror axis 80 as is represented 81.

With the plane of polarization of the laser beam either parallel or perpendicular to the mirror axis, the plane polarization characteristic of the beam is preserved as it reflects from the mirror. It is to be noted that the plane of polarization of the beam, with respect to the spacecraft body, as it leaves the mirror will rotate with the rotation of the gimbals about the rotation axis 12 of the spacecraft. The conventional beam modulator 30 (FIG. 6) requires a predetermined fixed (stationary) plane polarized beam input. By using a conventional quarter wavelength (at the laser beam frequency) plate 82 that rotates with the gimbals about the spacecraft rotation axis to change the plane polarized beam coming from the folding mirror 28 to a circularly polarized beam (either right hand or left hand) and another quarter wavelength plate 83 to change the circularly polarized beam back to a plane polarized beam, a constant position plane polarized beam is presented to the beam modulator 30. It is required, as is well known, that the quarter-wave plate 82 be physically positioned with respect to the plane polarized beam entering it such that the plane of polarization of the perpendicularly incident beam on it be at an angle of 45° with the optic axis of the plate to convert the plane polarized beam to a circularly polarized beam. The angle of the plane polarized beam emanating from quarter-wave plate 83 is also dependent upon the physical positioning of its optic axis. Thus, either quarter-wave plate 83 or the beam modulator element 30, or both, are rotated with respect to each other to provide the proper relationship of the plane polarized beam entering the modulator. Commercially available modulators may be specified to incorporate a quarter-wave plate properly positioned in their structure so they can receive a circularly polarized light input and provide a modulated plane polarized light output. In which case quarter-wave plate 83, as a separate item, is not required.

It is generally preferred that the transposition from plane polarized light to circularly polarized take place after the laser beam has been reflected from the folding mirror. However, quarter-wave plate 82 changing the beam from plane polarized to circularly polarized may be positioned in the sun tracking telescope following the laser and before the folding mirror. When this configuration of structure is used some loss occurs due to the slightly elliptical polarization resulting from angular changes in the position of the folding mirror. The second quater-wave plate produces a plane polarized wave from the ellipitcal wave but with slightly reduced energy content from that of the preferred structure.

The beam modulator 30 of FIG. 6 is similar to the modulator of the previous embodiment shown in FIG. 2. Laser beam modulators are well known and readily available commercially for modulation rates below 100Mbps (Mega-bits per second) and available on special order up to 1,000 Mbps. Any of the conventional laser beam modulation techniques external to the laser may be used with the disclosed system such as, pulse gated binary modulation (PGBM), quadruphase shift key modulation (QPSK), and others. These (external modulators) are preferred so that the high speed modulators may be physically placed within the spacecraft body rather attempting to transfer high speed electrical signals, requiring wide bandwidths, through the slip rings into the sun seeking telescope with the attendant losses and data errors.

We claim:

1. A laser communication system for transmitting a signal from a spacecraft to a remote receiver, said spacecraft having an axis of rotation, comprising:

a. a first set of hollow gimbals mounted on said spacecraft on the said axis of rotation;

b. a second set of hollow gimbals mounted on said spacecraft on the said axis of rotation in space-apart relationship to the said first set of gimbals;

c. a sun tracking telescope tube having a central axis attached to the said first set of gimbals;

d. a remote receiver tracking telescope attached to the said second set of gimbals;

e. a first folding mirror positioned in the said first set of gimbals, the said first folding mirror having an axis of rotation perpendicular to the spacecraft axis of rotation;

f. a second folding mirror positioned in the said second set of gimbals, the said second folding mirror having an axis of rotation perpendicular to the spacecraft axis of rotation;

g. a solar pumped laser receiving rays from the sun and generating a plane polarized laser beam along the said sun tracking telescope axis;

h. a heat sink cooperating with the said solar pumped laser, positioned in the said sun tracking telescope, radiating heat energy into deep space;

i. means for positioning the said laser in the said sun tracking telescope so that the polarization of the laser beam is parallel to the said axis of rotation of the said first folding mirror;

j. a first quarter-wavelength plate mounted in the said first gimbals, perpendicular to the spacecraft axis of rotation for changing the said plane polarized laser beam to a substantially circularly polarized beam;

k. a second quarter-wavelength plate mounted in the said spacecraft perpendicular to the said spacecraft axis of rotation for changing the said circularly polarized beam to a plane polarized beam; and l. means responsive to the said signal to be transmitted to the remote receiver, cooperating with the said plane polarized beam from the said second quarter-wavelength plate, for modulating the said laser beam.

2. The laser communication system as claimed in claim 1 wherein a sun seeker detector is positioned in the said sun tracking telescope and means cooperates with the said sun seeker for directing the sun tracking telescope toward the sun.

3. The laser communication system as claimed in claim 2 wherein the said solar pumped laser is an end pumped laser.

4. A laser communication system for transmitting a signal from a spacecraft to a remote receiver, said spacecraft having an axis of rotation, comprising:
   a. a first set of hollow gimbals mounted on said spacecraft on the said axis of rotation;
   b. a second set of hollow gimbals mounted on said spacecraft on the said axis of rotation in spaced-apart relationship to the said first set of gimbals;
   c. a sun tracking telescope tube having a control axis attached to the said first set of gimbals;
   d. a remote receiver tracking telescope attached to the said second set of gimbals;
   e. a first folding mirror positioned in the said first set of gimbals, the said first folding mirror having an axis of rotation perpendicular to the spacecraft axis of rotation;
   f. a second folding mirror positioned in the said second set of gimbals, the said second folding mirror having an axis of rotation perpendicular to the spacecraft axis of rotation;
   g. a solar pumped laser receiving rays from the sun and generating a plane polarized laser beam along the said sun tracking telescope axis;
   h. a heat sink cooperating with the said solar pumped laser, positioned in the said sun tracking telescope radiating heat energy into deep space;
   i. means for positioning the said laser in the said sun tracking telescope so that the polarization of the laser beam is perpendicular to the said axis of rotation of the said first folding mirror and perpendicular to the said sun tracking telescope axis;
   j. a first quarter-wavelength plate mounted in the said first gimbals, perpendicular to the spacecraft axis of rotation for changing the said plane polarized laser beam to a substantially circularly polarized beam;
   k. a second quarter-wavelength plate mounted in the said spacecraft perpendicular to the said spacecraft axis of rotation for changing the said circularly polarized beam to a plane polarized beam; and
   l. means responsive to the said signal to be transmitted to the remote receiver, cooperating with the said plane polarized beam from the said second quarter-wavelength plate, for modulating the said laser beam.

5. The laser communication system as claimed in claim 4 wherein a sun seeker detector is positioned in the said sun tracking telescope and means cooperates with the said sun seeker for directing the sun tracking telescope toward the sun.

6. The laser communication system as claimed in claim 5 wherein the said solar pumped laser is an end pumped laser.

* * * * *